United States Patent
Gustavsson

(10) Patent No.: US 7,236,602 B2
(45) Date of Patent: Jun. 26, 2007

(54) DEVICE FOR ACTUATING A MEMBRANE AND A VEHICLE COMPRISING A DEVICE FOR ACTUATING A MEMBRANE

(75) Inventor: Mats Gustavsson, Helsingborg (SE)

(73) Assignee: Magna Donnelly Corporation, Troy, MI (US)

( * ) Notice: Subject to any disclaimer, the term of this patent is extended or adjusted under 35 U.S.C. 154(b) by 96 days.

(21) Appl. No.: 10/511,738

(22) PCT Filed: Apr. 14, 2003

(86) PCT No.: PCT/SE03/00597

§ 371 (c)(1), (2), (4) Date: Oct. 18, 2004

(87) PCT Pub. No.: WO03/088205

PCT Pub. Date: Oct. 23, 2003

(65) Prior Publication Data

US 2005/0147260 A1    Jul. 7, 2005

(30) Foreign Application Priority Data

Apr. 18, 2002 (SE) .................................... 0201179

(51) Int. Cl.
*H04R 25/00* (2006.01)
(52) U.S. Cl. .................... 381/152; 381/423; 381/424
(58) Field of Classification Search .................. 381/86, 381/152, 389, 182, 337, 386, 396, 398, 423–425, 381/431; 181/157, 171, 161, 32, 167, 173
See application file for complete search history.

(56) References Cited

U.S. PATENT DOCUMENTS

| | | | | |
|---|---|---|---|---|
| 3,107,746 A | | 10/1963 | Namon | .................. 181/161 |
| 3,484,006 A | * | 12/1969 | Burke | .................. 414/303 |
| 4,551,849 A | | 11/1985 | Kasai et al. | .................. 381/86 |
| 5,196,755 A | * | 3/1993 | Shields | .................. 310/324 |
| 5,750,942 A | * | 5/1998 | Flick | .................. 181/141 |
| 5,812,684 A | | 9/1998 | Mark | .................. 381/86 |
| 5,950,756 A | * | 9/1999 | Satoh et al. | .................. 180/312 |
| 6,983,819 B2 | * | 1/2006 | Busque et al. | .................. 181/150 |

FOREIGN PATENT DOCUMENTS

| | | |
|---|---|---|
| DE | 19826171 | 10/1999 |
| JP | 06205497 A | 7/1994 |
| WO | WO 96/35313 | 11/1996 |

\* cited by examiner

*Primary Examiner*—Huyen Le
(74) *Attorney, Agent, or Firm*—Clark Hill PLC

(57) ABSTRACT

A device is provided for actuating a membrane arranged in an opening to a space, and a vehicle having such a device. The membrane has a first surface and a second opposite surface, and is limited by an edge area. The device includes a first strip to be attached to the second surface of the membrane in the edge area, and a second strip to be attached to a surface of a frame portion extending around the opening. An exchanging member is arranged between and connecting the first strip and the second strip. An actuating member is arranged to transfer a reciprocating primary movement to the exchanging member converting the primary movement to a reciprocating secondary movement, which has a longer length of stroke than the primary movement and acts on the strips to move towards and away from each other.

29 Claims, 5 Drawing Sheets

DEVICE FOR ACTUATING A MEMBRANE AND A VEHICLE COMPRISING A DEVICE FOR ACTUATING A MEMBRANE

THE BACKGROUND OF THE INVENTION AND PRIOR ART

The present invention refers to a device for actuating a membrane arranged in an opening to a space, wherein the membrane has a first surface and a second opposite surface, and is limited by an edge area extending around the membrane.

It is known to use such devices for actuating a membrane arranged to generate sound. The membrane may for instance generate sound in the form of music or any other desired sound. The membrane may also be arranged to generate sound for attenuating other sounds, so called active sound reduction. Different types of such membranes are known, for instance in various types of loudspeaker designs, various types of panels such as hat racks in vehicles or windowpanes in vehicles.

U.S. Pat. No. 4,551,849 discloses a sound reducing system arranged to vibrate a panel in a vehicle. In the first place, this document is directed to the vibration of the hat rack. Also other types of panels are mentioned, for instance side doors, instrument panels etc.

U.S. Pat. No. 5,812,684 discloses another device for active sound reducing in motor vehicles, in particular for reducing noise from outside. The device includes an actuating member in the form of a piezoceramic element which is arranged to vibrate a windowpane of the vehicle. The pane disclosed is supported by an elastomeric strip extending around the pane.

JP-A-06205497 discloses a device for vibrating a rear window of a vehicle in order to generate low frequency sound. The device includes an actuating member acting against the window at a substantially central point thereof. The window is supported in the vehicle in a conventional manner by means of a rubber strip.

WO96/35313 discloses a device for obtaining acoustic vibrations in a medium by means of a transparent body, for instance a windowpane. In an embodiment, a windowpane is brought to vibrate by means of a piezoelectric element that is connected to a frame and extends between the frame and the pane proper.

During certain conditions windowpanes are suitable for obtaining sound with a relatively low frequency. These windowpanes may thereby advantageously be used as bass loudspeakers included in a music equipment or sound-generating element in a device for reducing or attenuating sound or noise, i.e. in particular low frequency sound. Windowpanes often have a relatively large surface and are thanks to a curved or double curved design relatively rigid. As actuating members for vibrating a membrane or for instance a windowpane it is known to use piezoelements. One problem with such piezoelements is however that the length of stroke obtained is too short for bringing a windowpane to a movement with a sufficient amplitude in an efficient manner. An other important precondition for being able to vibrate such a membrane in an efficient manner is that the membrane is supported by a flexible device permitting the vibration of the membrane. It is then important that the parts of the actuating device, which are not actuating the pane, have a small resistance against the movement of the membrane.

SUMMARY OF THE INVENTION

The object of the present invention is to provide an improved device for holding and actuating a membrane. In particular, it is aimed at an actuating device permitting the membrane to move with a small friction and with a relatively large amplitude. Furthermore, it is aimed at an actuating device also permitting the incorporation of an actuating member for achieving a movement of the membrane held by the actuating device.

By means of such a device, which includes an exchanging member, an efficient movement of the membrane may be achieved by means of an actuating member having a relatively short length of stroke or vibration amplitude. The exchanging member permits the membrane to move with a significantly longer length of stroke than the direct movement produced by the actuating member and acting on the exchanging member. By means of this device, it is thus possible to put the membrane into a movement with such an amplitude that sound having a sufficient loudness may be generated.

According to an embodiment of the invention, the primary movement extends along a primary axis and the secondary movement extends along a secondary axis forming an angle to the primary axis. Consequently, the actuating member does not need to act in a direction forming the normal to a main extension plane of the membrane, which of course is the most effective direction for generating sounds. The possibilities to house the actuating member in a suitable manner, in for instance a vehicle in which the membrane is mounted, are thus improved. Said angle may advantageously be substantially perpendicular.

According to a further embodiment of the invention, the exchanging member includes a rod, which extends between and substantially in parallel to the first strip and the second strip, a plurality of inclined first link elements, which extend between the rod and the first strip, and a plurality of inclined second link elements which extend between the rod and the second strip. Such a design of the device and the exchanging member gives a low inner friction, and thus permits the membrane to move easily in parallel with the secondary axis and the normal to the main extension plane of the membrane. When the primary movement is transferred to the rod, the link elements will thus rotate so that they are inclined with a larger angle to the rod and the respective strip, and thus displace the strips from each other. In the same way the strips are again pulled towards each other when the rod is moved in the opposite direction. The actuating member may suitably be arranged in such a way that it moves the strips to move away from or towards each other. The link elements may be inclined with an angle that in a rest state is 10–80°, preferably 30–60°, for instance 35–45°. The exchange of the exchanging member is determined by the angle of inclination of the link elements in such a way that the smaller the inclination angle the larger the exchange.

According to a further embodiment of the invention, the actuating member is arranged to transfer the primary movement of the rod in such a way that it reciprocates in this longitudinal direction and substantially in parallel with the primary axis, wherein the strips will move towards and away from each other substantially in parallel with the secondary axis. Advantageously, the first link elements extend substantially in parallel to each other. In the same way also the second link elements extend substantially in parallel with each other.

According to a further embodiment of the invention, each link element has a first end, which is articulately connected to the rod in a flexible first joint, and a second end, which is articulately connected to the respective strip in a flexible second joint. The joints are flexible in a first plane including the primary axis and the secondary axis. However, the joints are advantageously relatively rigid in a plane forming an angle with said first plane. Advantageously, each link element is relatively rigid between the first end and the second end. In such a way it is ensured that when the rod is displaced in a direction, the link elements will not be bent but maintain their original shape, wherein a rotation of the link elements takes place at the first and second joints in relation to the rod and the respective strip. Each link element may include any means for stiffening the link element, for instance a thickened longitudinal portion or a longitudinal flange.

According to a further embodiment of the invention, each link element extends from the respective strip towards the rod and towards the actuating member in such a way that the first and second link elements form an arrow-like configuration pointing towards the actuating member. Advantageously, the device may include a first actuating member and a first exchanging member, and a second actuating member and a second exchanging member, wherein the first exchanging member is provided in the proximity of the second exchanging member in such a way that the two exchanging members point away from each other towards the respective actuating member. By such a configuration, an efficient movement of the membrane is produced when the movements of the two actuating members are coordinated to each other. An advantage with such a pair of link elements is also that the whole horizontal movement of the actuating members is convened to a pure vertical movement of the membrane.

According to a further embodiment of the invention, the actuating member is provided between the first strip and the second strip. In such a way, the actuating member may be housed in a very space saving manner. Furthermore, the actuating member may advantageously include a piezoelectric element.

According to a further embodiment of the invention, the membrane has a somewhat curved shape. Such a curved or domed shape of the membrane increases the inherent stiffness of the membrane proper, which improves its ability to follow the movement initiated by the actuating member and the exchanging member.

According to a further embodiment of the invention, the device is arranged to create a secondary sound field in the space, wherein the device includes a control unit, which is connected to the actuating member for controlling the primary movement of the actuating member. Furthermore, the device may be arranged to reduce a primary sound field in the space by means of the secondary sound field, wherein the device includes at least one sensor, which senses the primary sound field and is connected to the control unit.

According to a further embodiment of the invention, the space forms the passenger compartment in a vehicle. The membrane may then advantageously be either a front shield and/or a rear window of the vehicle.

BRIEF DESCRIPTION OF THE DRAWINGS

The invention is now to be explained by means of a description of various embodiments and with reference to the drawings attached.

DETAILED DESCRIPTION OF VARIOUS EMBODIMENTS OF THE INVENTION

Figure 1:
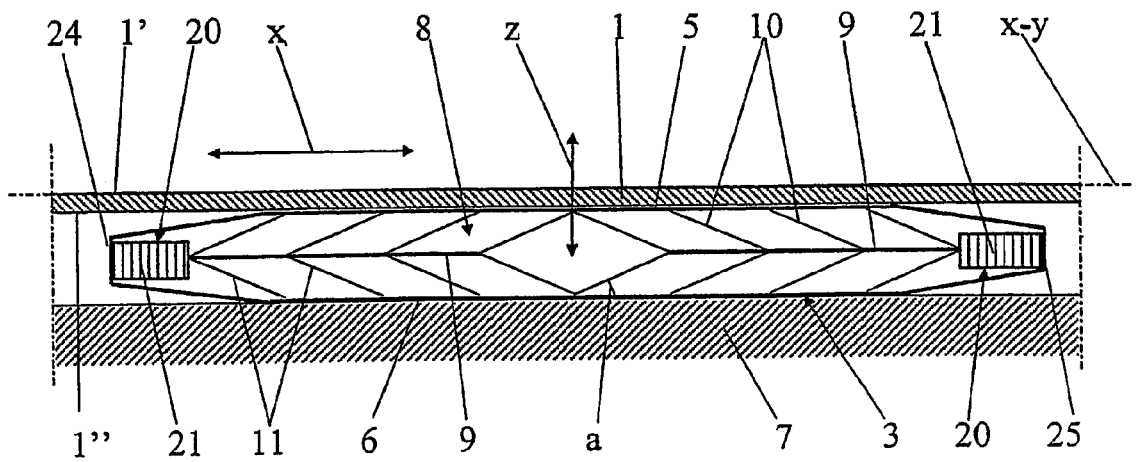
FIG. 1 discloses schematically a side view of a device according to a first embodiment of the invention.
Figure 2:
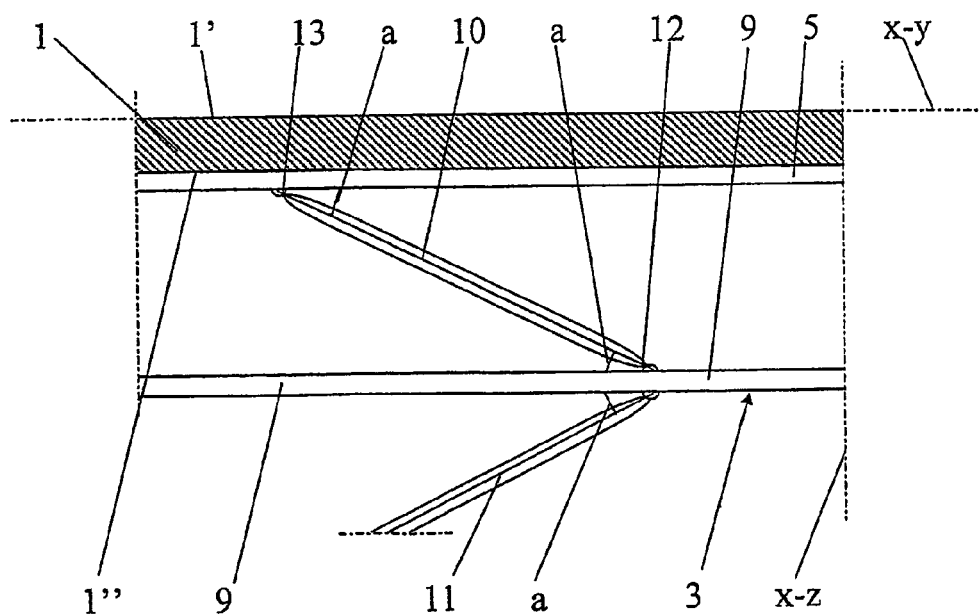
FIG. 2 discloses a side view of a part of the device in FIG. 1.
Figure 3:
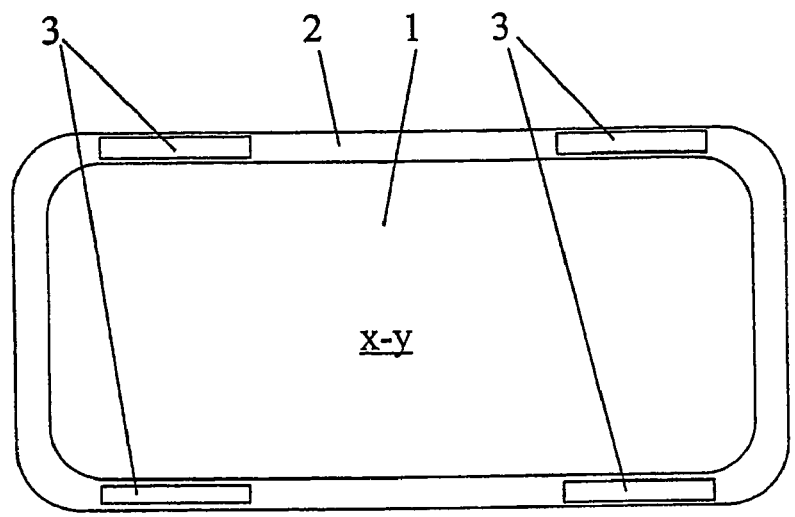
FIG. 3 discloses schematically a view in a smaller scale from above of a membrane actuated by four devices according to FIG. 1.

FIGS. 1–3 disclose a membrane 1 which is intended to be provided around an opening to a space. The membrane 1 may be formed by a plurality of various elements characterized by a relatively large extension in parallel to a main extension plane x-y, see FIG. 3, and a relatively small thickness perpendicular to this extension plane x-y, see FIG. 1. In the following, we will exemplify the invention in connection with motor vehicles, and especially cars. The invention may however be applied to many various objects and structures where one desires to hold a membrane 1 for generating sound, either in order to reduce or attenuate other sounds or create sound for listening. In addition to cars, the invention may thus be applied to other types of motor vehicles, such as buses and trucks, caravans, aeroplanes, ships and boats etc. The invention is also applicable to stationary structures, for instance different kinds of buildings.

In cars, the membrane 1 may be formed by a plurality of various present vehicle components or particular components used merely for this purpose. Examples of present components that can be used for the membrane 1 are the windowpanes of the vehicle, especially the rear pane and/or the front shield. In this case, the membrane 1 is thus provided to cover an opening to the passenger compartment of the vehicle. The membrane 1 has a first surface 1' and a second opposite surface 1". The membrane 1 is limited by an edge area 2 extending around the membrane 1.

FIG. 1–3 also disclose a first embodiment of a device 3 for holding and actuating the membrane 1. The device 3 includes a first strip 5, which is arranged to be attached to the second surface 1" of the membrane in the edge area 2. The device 3 also includes a second strip 6, which is arranged to be attached to a surface of a frame portion 7 extending around the opening. The frame portion 7 is part of the object or the structure to which the device 3 is to be applied, in the example disclosed a part of the vehicle. The device 3 also includes an exchanging member 8, which is provided between and connects the first strip 5 and second strip 6. The exchanging member 8 includes a rod 9, which extends between and substantially in parallel with the first strip 5 and the second strip 6. Furthermore, the exchanging member 8 includes a plurality of inclined first link elements 10, which extend between the rod 9 and the first strip 5, and a plurality of inclined second link elements 11, which extend between the rod 9 and the second strip 6. The first link elements 10 extend substantially in parallel to each other. Also the second link elements 11 extend substantially in parallel to each other.

Each link element 10, 11 has a first end, which is articulately connected to the rod 9 in a flexible first joint 12, and a second end, which is articulately connected to the respective strip 5, 6 in a flexible second joint 13, see FIG. 2. The flexible joints 12, 13 may be obtained for instance by giving the link elements 10, 11 at the ends or in the proximity of the ends a thinner thickness of material than between the ends. Between the ends, the link elements 10, 11 are relatively rigid. The rigidity may be increased by letting the link elements 10, 11 include one or several longitudinal ribs or longitudinal flanges. The strips 5, 6, the rod 9 and the link elements 10, 11 have a relatively short extension in a plane x-z, which is perpendicular to the main extension plane x-y, but a relatively large extension perpendicular to this plane, compare FIG. 3. As appears from FIGS. 1 and 2, each link element 10, 11 extends from the respective strip 5, 6 towards the rod 9 in such a way that the link elements 10, 11 together with the rod 9 form an arrow-like configuration.

By the proposed design of the exchanging member 8, it is thus possible displace the membrane 1 towards and away from the frame portion 7. If the rod 9 performs a reciprocating primary movement along a primary axis x, which extends substantially in parallel with the plane x-y, the link elements 10, 11 will rotate around the joints 12, 13 so that the first strip 5 is displaced in relation to the second strip 6 by a reciprocating secondary movement in parallel with a secondary axis z which is substantially perpendicular to the extension plane x-y. The secondary axis z is substantially perpendicular to the primary axis x.

The exchanging member 8 may be manufactured in various ways. According to an embodiment of the exchanging member 8, i.e. the strips 5, 6, the link elements 10, 11 and the rod 9, may be manufactured in one single piece of any suitable material, for instance a mould injected plastic material. The strips 5, 6, the link elements 10, 11 and the rod 9 may also be manufactured separately from each other and thereafter joined to the structure disclosed, for instance by gluing or melting. In this case the different elements may be manufactured of any suitable plastic material, metal material, or any composite material, for instance glass fibre laminate.

The device 3 also includes an actuating member 20, which is arranged to transfer said reciprocating primary movement to the exchanging member 8 by displacing the rod 9. The actuating member 20 may advantageously include a piezoelectric element 21, which is in engagement with and connected to the rod 9 in such a way that pushing and pulling forces may be transferred from the actuating member 20 to the rod 9 at the same time as the rod 9 may be displaced in parallel to the axis z in relation to the actuating member 20. The actuating member 20 may thus be arranged to displace the rod 9 substantially in parallel to the primary axis x in a reciprocating primary movement. This primary movement is transferred via the link elements 10, 11 to the first strip 5, which thus moves with a reciprocating secondary movement in parallel with the secondary axis z in relation to the second strip 6 and the frame portion 7.

The link elements 10, 11 are inclined by an angle a in relation to the rod 9 and the strips 5, 6. Depending on the size of the angle a, the exchange of the exchanging member 8 may be determined. A more acute angle a between the link elements 10, 11, and the rod 9 and the strips 5, 6, respectively, gives a higher exchange than a less acute angle a. The angle a may in a rest state be for instance 10–80°, preferably 30–60°, for instance 30–45°. An angle a of 45° with regard to the two strips 5, 6 and the rod 9 gives a total exchange between the primary movement and the secondary movement of 1:2.

In the first embodiment disclosed in FIG. 1, the device 3 includes a first actuating member 20 and a first exchanging member 8 pointing to the left in the figure, and a second actuating member 20 and a second exchanging member 8 pointing to the right in the figure. The two exchanging members 8 are provided adjacent to each other, and thus point away from each other towards the respective actuating member 20. Furthermore, the strips 5 and 6 are connected to each other via transversal portions 24, 25, which may be an integrated part of the exchanging member 8 and extend between the strips 5, 6 immediately outside the actuating member 20. In such a way, the device will be kept together by the strips 5 and 6. A change of the length of the piezoelectric element 21 in parallel with the primary axis x will result in a displacement of the strips in relation to each other in parallel with the secondary axis z. By such a configuration, an efficient movement of the membrane 1 may thus be obtained when the movements of the two actuating members 20 are co-ordinated to each other. FIG. 3 discloses an embodiment where the membrane 1 is held in its edge area by four devices 3 of the type disclosed in FIGS. 1 and 2. By four such devices 3, it may be ensured that the whole membrane 1 is put into movement.

Figure 4:
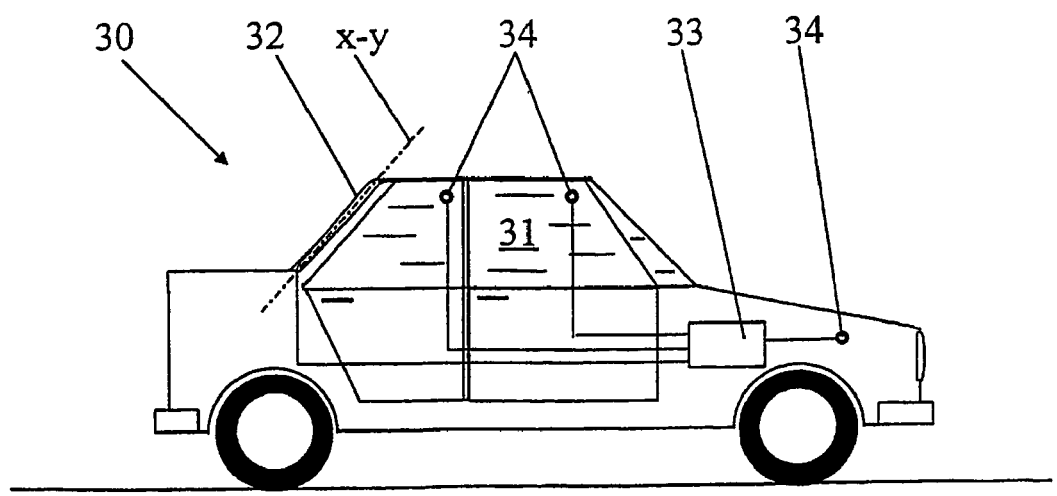
FIG. 4 discloses schematically a side view of a vehicle according to the invention.
Figure 5:
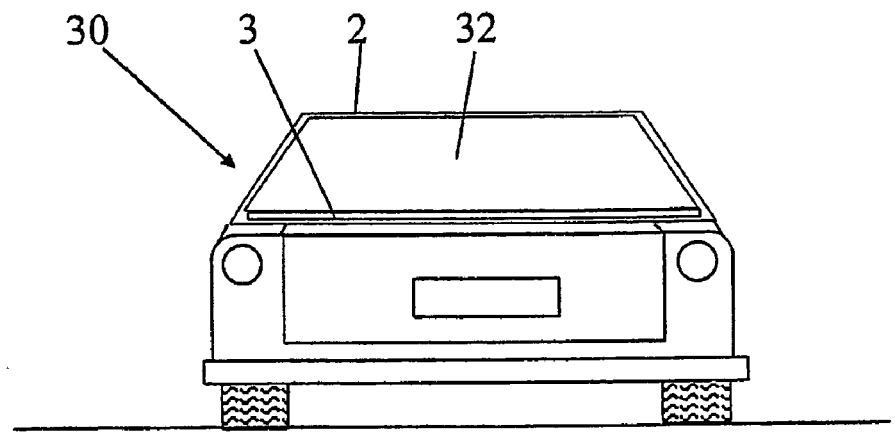
FIG. 5 discloses schematically a rear view of the vehicle in FIG. 3.
Figure 6:
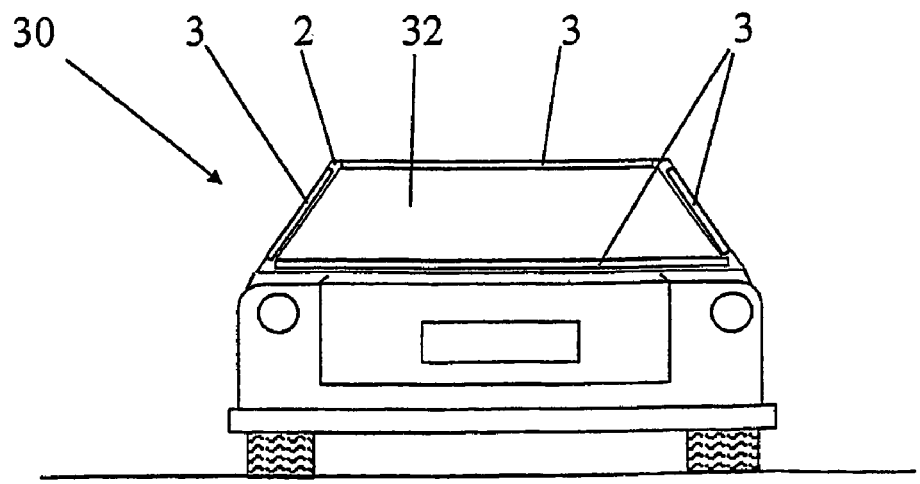
FIG. 6 discloses schematically a rear view of an alternative design of the vehicle in FIG. 3.

The device 3 may advantageously be used for vibrating a membrane 1 for generating sound. This application of the device 3 may be used in vehicles, which is schematically illustrated in FIGS. 4–6. In the application disclosed, the device 3 is intended to reduce the sound level in the passenger compartment 31 of the vehicle 30. In this application, the device 3 is arranged to hold the rear pane 32 of the vehicle 30, which thus forms the membrane. The rear pane 32 has a somewhat domed or curved shape, which is advantageous since it increases the stiffness of the rear pane 32. However, the rear pane 32 extends along a main extension plane x-y that is substantially perpendicular to the secondary axis z.

In the embodiments disclosed in FIGS. 4–6, the device 3 is arranged to create a secondary sound field in the passenger compartment 31 of the vehicle 30 in particular for reducing a primary sound field in the passenger compartment 31. The device 3 includes a schematically disclosed control unit 33 and a number of sensors 34, which sense the primary sound field and are connected to the control unit 33. The control unit 33 is connected to the actuating member 20 for controlling the primary movement of the actuating member 20 with regard to the primary sound field. One example of how the control unit 33 may be designed and co-operate with sensors and sound influencing members, which in this case is formed by the membrane 1 or the rear pane 32, is more closely disclosed in WO01/41123.

FIG. 5 discloses an embodiment where the rear pane is held by one or several devices 3, which extend along the edge area 2 along a lower edge of the rear pane 32. The upper edge and the side edges of the rear pane 32 are attached to the vehicle 30 in such a way that the rear pane may rotate around a rotary axis extending in parallel with the upper edge.

FIG. 6 discloses another embodiment where the rear pane 32 is held by devices 3 extending along parts of the edge area 2 at the lower edge, the upper edge and the side edges.

Figure 7:
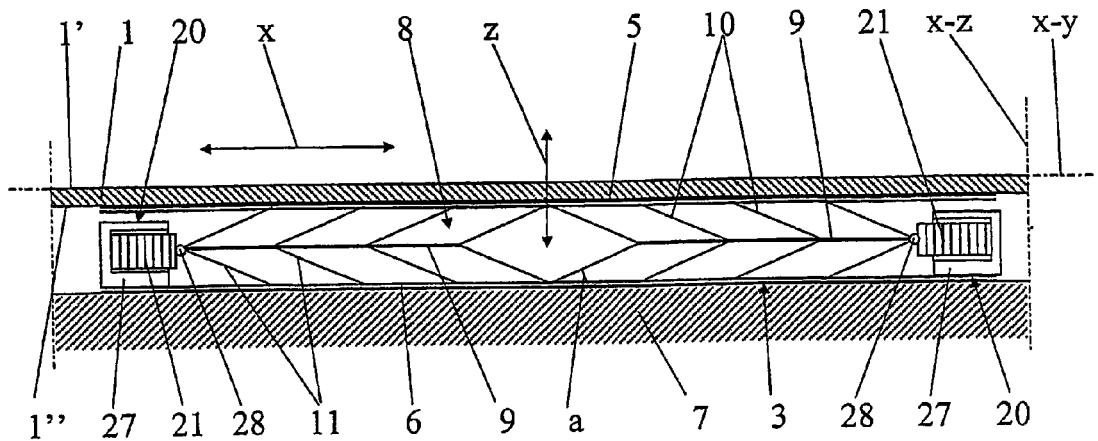
FIG. 7 discloses schematically a side view of a device according to a second embodiment of the invention.

FIG. 7 discloses a second embodiment of the device 3 for holding and actuating the membrane 1. In all disclosed embodiments, elements having the same function have been provided with the same reference signs. The second embodiment differs from the first embodiment in that the strips 5 and 6 are not connected to each other by means of any transversal portions. The actuating member 20 instead includes a holder 27 for the piezoelectric element 21. The holder 27 is attached to the second strip 6. The piezoelectric element 21 is connected to the rod by means of a schematically disclosed roller bearing 28, which permits transfer of pushing and pulling forces from the actuating member 20 to the rod 9 at the same time as the rod 9 may be displaced in parallel with the axis z in relation to the actuating member 20. The actuating member 20 will thus also in this case displace the rod 9 substantially in parallel with the primary axis x in a reciprocating primary movement. This primary movement is transferred via the link elements 10, 11 to the first strip 5 which thus reciprocates with a secondary movement in parallel with the secondary axis z in relation to the second strip 6 and the frame portion 7.

Figure 8:
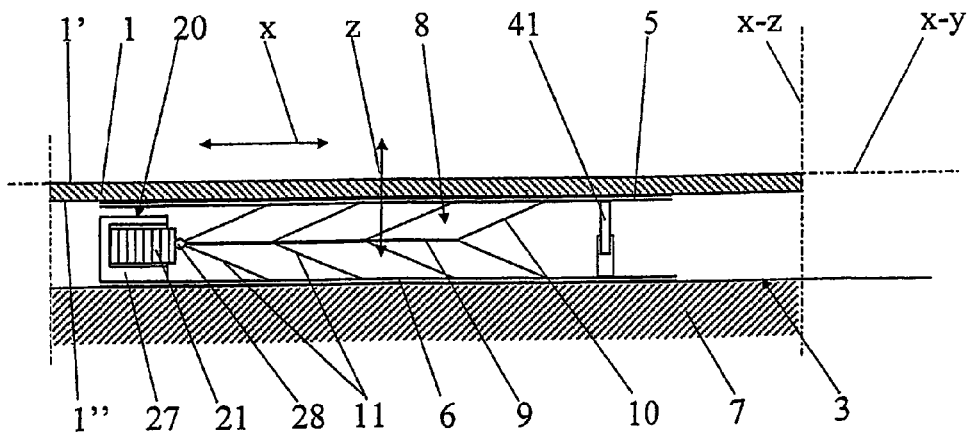
FIG. 8 discloses schematically a side view of a device according to a third embodiment of the invention.

FIG. 8 discloses a third embodiment of the device 3 for holding and actuating the membrane 1. The third embodiment differs from the first embodiments in that the device includes only one exchanging member 8 and one actuating member 20. In this case, a schematically disclosed guide member 41 is provided for guiding the movement of the strips 5, 6 in such a way that it only may be displaced in parallel with the secondary axis z. The guide member 41 thus prevents the strips 5, 6 from moving in parallel with the plane x-y in relation to each other.

Figure 9:
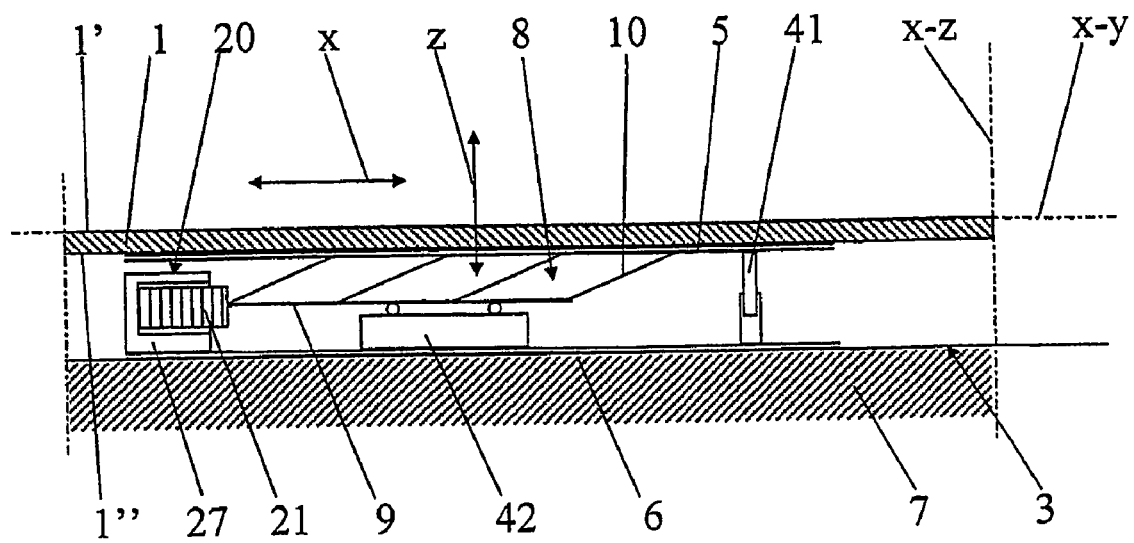
FIG. 9 discloses schematically a side view of a device according to a fourth embodiment of the invention.

FIG. 9 discloses a fourth embodiment of the device 3 for holding and actuating the membrane 1. The fourth embodiment differs from the third embodiment in that the device includes only one actuating member 20 and only one exchanging member 8 with only the first link elements 10. In this case there is in addition to the guide member 41 also a schematically disclosed support member 42 for supporting the rod 9. The support member 42 permits the displacement of the rod in parallel with the plane x-y but prevents the rod 9 from being displaced in parallel with the secondary axis z.

It is to be noted that the guide member 41 and the support member 42 may be designed in many various ways.

The invention is not limited to the embodiments disclosed but may be varied and modified within a scope of the following claims.

The invention claimed is:

1. A device for actuating a membrane arranged in an opening to a space, wherein the membrane has a first surface and a second opposite surface, and is limited by an edge area extending around the membrane, wherein the device includes:
   a first strip, which is adapted to be attached to the second surface of the membrane in the edge area,
   a second strip, which is adapted to be attached to a surface of a frame portion extending around the opening,
   at least one exchanging member, which is provided between and connecting the first strip and the second strip,
   at least one actuating member arranged to transfer a reciprocating primary movement to the exchanging member, which is arranged to convert the primary movement to a reciprocating secondary movement having a longer length of stroke than the primary movement and acting on the strips in such a way that at least one of the strips moves towards and away from the other strip, wherein the primary movement extends along a primary axis (x) and the secondary movement extends along a secondary axis (z) forming an angle to the primary axis (x), and
   the exchanging member including a rod extending longitudinally between and parallel to the first strip and second strip wherein the actuating member is arranged to engage and transfer the primary movement to the rod in such a way that it reciprocates linearly along its longitudinal direction parallel with the primary axis (x) to force the strips to move towards and away from each other parallel with the secondary axis (z).

2. A device according to claim 1, wherein the exchanging member includes a plurality of inclined first link elements, which extend between the rod and the first strip, and a plurality of inclined second link elements, which extend between the rod and the second strip.

3. A device according to claim 2, wherein the first link elements extend parallel to each other and wherein the second link elements extend parallel with each other, wherein each of the first and second link elements move simultaneously and in parallel to move the strips along the secondary axis (z) in response to the linear reciprocating movement of the rod along the primary axis (x).

4. A device according to claim 3, wherein each link element has a first end, which is articulately connected to the rod in a flexible first joint, and a second end, which is articulately connected to the respective strip in a flexible second joint.

5. A device according to claim 4, wherein each link element is rigid between the first end and the second end.

6. A device according to claim 5, wherein each link element extends from the respective strip towards the rod and towards the actuating member in such a way that the first and second link elements form an arrow configuration pointing towards the actuating member.

7. A device according to claim 6, wherein the at least one actuating member includes a first actuating member and a second actuating member and the at least one exchanging member includes a first exchanging member and a second exchanging member, wherein the first exchanging member is provided in the proximity of the second exchanging member in such a way that the two exchanging members point away from each other towards the respective actuating member.

8. A device according to claim 7, wherein the primary axis (x) is perpendicular to the secondary axis (z).

9. A device according to claim 8, wherein the at least one actuating member is provided between the first strip and the second strip.

10. A device according to claim 9, wherein the at least one actuating member includes a piezoelectric element.

11. A device according to claim 10, wherein the membrane has an at least partially curved shape.

12. A device according to claim 6, wherein the actuating member is supported by a holder positioned between the first and second strips, and wherein the holder is fixedly secured to the second strip and supported by the frame portion.

13. A device according to claim 12, further including a roller bearing interconnecting the rod to the actuating member for allowing the rod to be displaced parallel to the secondary axis (z) in relation to the actuating member in response to linear reciprocating movement of the rod along the primary axis (x).

14. A device according to claim 13, further including a guide member extending along the primary axis (x) and connected between the first strip and the second strip for guiding the movement of the strips along the secondary axis (x).

15. A device according to claim 9, wherein each of the first and second strips include opposing first and second ends, and wherein the first ends of the strips are connected by a first transversal portion and the second ends of the strips are connected by a second transversal portion.

16. A device according to claim 1, wherein the device is arranged to create a secondary sound field in the space and includes a control unit, which is connected to the actuating member for controlling the primary movement of the actuating member.

17. A device according to claim 16, wherein the device is arranged to reduce a primary sound field in the space by means of the secondary sound field and wherein the device includes at least one sensor, which senses the primary sound field and is connected to the control unit.

18. A device according to claim 17, wherein the space forms the passenger compartment in a vehicle.

19. A device according to claim 18, wherein the membrane is one of a front shield and a rear window of the vehicle.

20. A vehicle including a device for actuating a membrane arranged in an opening of the vehicle, wherein the membrane has a first surface and a second opposite surface, and is limited by an edge area extending around the membrane, wherein the device includes:
  a first strip attached to the second surface of the membrane in the edge area,
  a second strip attached to a surface of a frame portion extending around the opening,
  at least one exchanging member, which is arranged between and connecting the first strip with the second strip,
  at least one actuating member arranged to transfer a reciprocating primary movement to the exchanging member, which is arranged to convert the primary movement to a reciprocating secondary movement having a longer length of stroke than the primary movement and acting on the strips in such a way that they move towards and away from each other, wherein the primary movement extends along a primary axis (x) and the secondary movement extends along a secondary axis (z) forming an angle to the primary axis (x), and
  the exchanging member includes a rod extending longitudinally between and parallel to the first strip and the second strip wherein the actuating member is arranged to engage and transfer the primary movement to the rod in such a way that it reciprocate linearly along its longitudinal direction parallel to the primary axis (x) to force the strips to move towards and away for each other parallel with the secondary axis (z).

21. A vehicle according to claim 20, wherein the exchanging member includes a plurality of inclined first link elements, which extend between the rod and the first strip, and a plurality of inclined second link elements, which extend between the rod and the second strip.

22. A vehicle according to claim 21, wherein the first link elements extend parallel to each other and the second link elements extend parallel to each other, and wherein each of the first and second link elements move simultaneously and in parallel to move the strip along the secondary axis (z) in response to the linear reciprocating movement of the rod along the primary axis (x).

23. A device for actuating a membrane arranged in an opening defined by a frame portion, wherein the membrane has a first surface and a second opposite surface, and is limited by an edge area extending around the membrane, the device including:
  an elongate strip extending between a opposite first and second ends, wherein the strip is adapted to be attached to the second surface of the membrane in the edge area;
  an actuating member adapted to be supported by the frame portion; and
  an exchanging member operatively coupled between the strip and the actuating member for transferring a reciprocating primary movement along a linear primary axis(x) to a reciprocating secondary movement along a linear secondary axis (z) to move the strip towards and away from the frame portion,
  the exchanging member including a rod engaged with the actuating member and extending longitudinally parallel to the strip for linear movement along the primary axis (x) and a plurality of parallel link elements extending between and connecting the rod and the strip for transferring the reciprocating movement of the rod along the primary axis (x) to reciprocating movement of the strip along the secondary axis (z).

24. A device according to claim 23, further including a guide member extending along the primary axis (x) and connected between the strip and the frame portion for guiding the movement of the strip along the secondary axis (x).

25. A device according to claim 24, further including a support member positioned between the rod and the frame portion for supporting and guiding the rod along the primary axis (x).

26. A device according to claim 25, wherein each of the link elements has a first end articulatively connected to the rod in a flexible first joint and a second end articulately connected to the strip in a flexible second joint.

27. A device according to claim 26, wherein each link element is rigid between the first and second ends.

28. A device according to claim 27, wherein the actuating member includes a piezoelectric element.

29. A device according to claim 28, wherein the actuating member is supported by a holder positioned between the strip and the frame portion.

* * * * *